INVENTOR.
Dominic Errichiello,
BY Mueller & Aichele
Atty's.

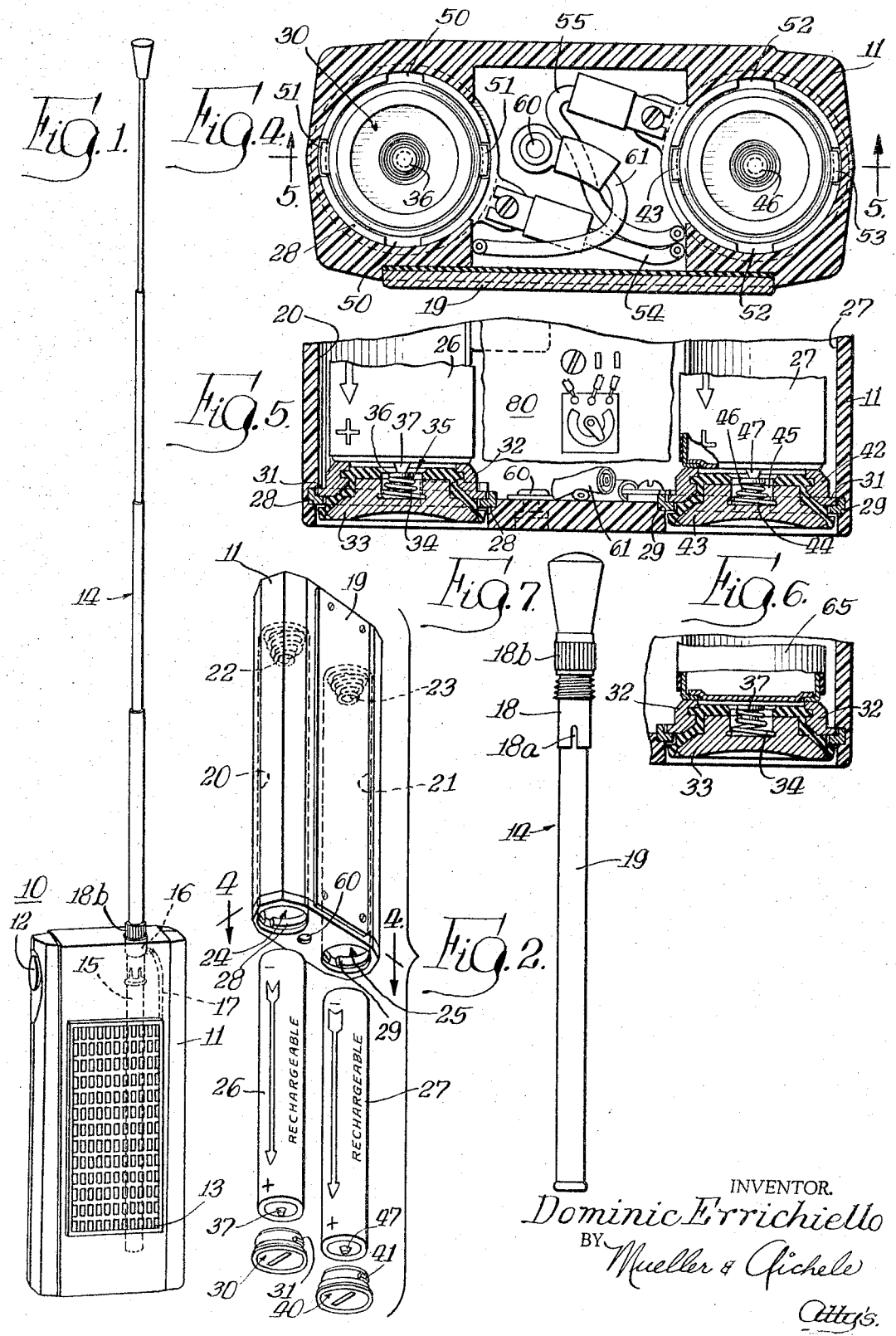

United States Patent Office 3,305,779
Patented Feb. 21, 1967

3,305,779
PORTABLE ELECTRONIC DEVICE FOR OPERATION BY RECHARGEABLE OR NONRECHARGEABLE SELF-CONTAINED BATTERY
Dominic Errichiello, Melrose Park, Ill., assignor to Motorola, Inc., Franklin Park, Ill., a corporation of Illinois
Continuation of application Ser. No. 155,777, Nov. 29, 1961. This application Oct. 14, 1963, Ser. No. 316,488
7 Claims. (Cl. 325—111)

This application is a continuation of application Serial No. 155,777, filed November 29, 1961, and now abandoned.

This invention relates in general to portable electronic devices and in particular to a pocket-sized, self-contained radio apparatus adapted for interchangeable operation from different types of battery power sources and antenna assemblies.

In recent years, miniaturized electronic apparatus has come into prominent usage, particularly radio devices intended for carrying on the person. Such devices are usually self-contained with suitable provisions for including their own battery power sources within associated radio housings. In operation, such devices may be only receiving apparatus for use in one-way signaling systems. In other instances, both transmitting and receiving apparatus may be provided for compatible operation in a conventional two-way communication system.

In all such miniaturized devices, however, a problem has been encountered in battery replacements due to the relatively small size of the apparatus. Dismantling of the entire housing has been a common requirement. Further, the majority of such devices are designed only for operation from single-use type batteries, such as the electrolytic pen-light or the mercury cell types. Others, while designed to operate from batteries of the type which may be recharged, usually require removal of the batteries before the recharging can be effected. Portable devices have been provided to accommodate the interchangeable use of both single-use and rechargeable type batteries, as disclosed in Patent No. 3,070,748, issued December 25, 1962, to Dominic Errichiello and Raymond G. Worobey, and assigned to the assignee of the present invention. The interchangeable use of different types of batteries in this system, however, requires the substitution of associated component parts, namely battery cap covers, along with the particular type batteries to be used.

Another problem frequently encountered in these miniaturized devices is in the replacement of antennas. Again, because of size and space consideration, such devices usually incorporate antennas as an integral part thereof. Replacements of antennas, because of damage or the like, require a substantial dismantling of the radio unit. Further, no provisions are made to incorporate more than one type of antenna even though a particular type may be preferred in one application over another type.

It is therefore an object of the present invention to provide an improved miniature radio device having housing provisions for interchangeably receiving batteries and antenna assemblies of different types.

Another object is to provide a miniaturized electronic apparatus which will accommodate both single-use, disposable and rechargeable type batteries without modification or substitution of associated component parts and wherein provisions are included for recharging the rechargeable type battery within the radio housing and for preventing inadvertent charging of the single-use type battery when being used.

A further object is to provide a miniature radio apparatus having a detachable antenna connector which will accommodate more than one type fo antenna and wherein antenna replacements may be effected without dismantling the radio housing, or disconnection of leads or solder connections.

A feature of the present invention is the provision of a miniature electronic device having a housing with first and second cylindrical battery compartments extending lengthwise along the sides of the housing and with openings in the bottom thereof having covers for accommodating both rechargeable and single-use type batteries inserted therein.

Another feature is the provision of a battery powered miniaturized electronic apparatus having battery cap covers each of which includes an inner conducting ring insulated from an outer conducting plate having a resilient contact positioned to be engaged by a protruding tip on the rechargeable battery such that electrical continuity is maintained between the rechargeable battery and the conducting plate of the battery cap cover for convenient recharging from an external power source.

Still another feature is the provision of a miniaturized radio device having a housing with a threaded ferrule bonded thereto and connected to the radio circuit, in which an antenna assembly having a threaded sleeve frictionally received thereon mates with the ferrule to facilitate antenna installations and removals and makes effective connection to the circuit without disconnecting leads or solder connections. Various types of antennas, such as telescoping and loop antennas may be used, and such antennas can be easily changed or replaced if damaged.

The invention is illustrated in the accompanying drawings in which:

FIG. 1 is a perspective view of the assembled transmitter embodying the present invention;

FIG. 2 is a perspective view of the transmitter with batteries and cap covers removed;

FIG. 4 is a top cross-sectional view showing notched conducting rings, contact terminal and connecting leads and taken along lines 4—4 of FIG. 2;

FIG. 5 is a partial side cross sectional view showing rechargeable type batteries assembled within the housing and taken along lines 5—5 of FIG. 4;

FIG. 6 is a partial side cross sectional view showing a single-use type battery assembled within the housing;

FIG. 7 illustrates the telescopic antenna assembly removed from the housing;

Figure 3:
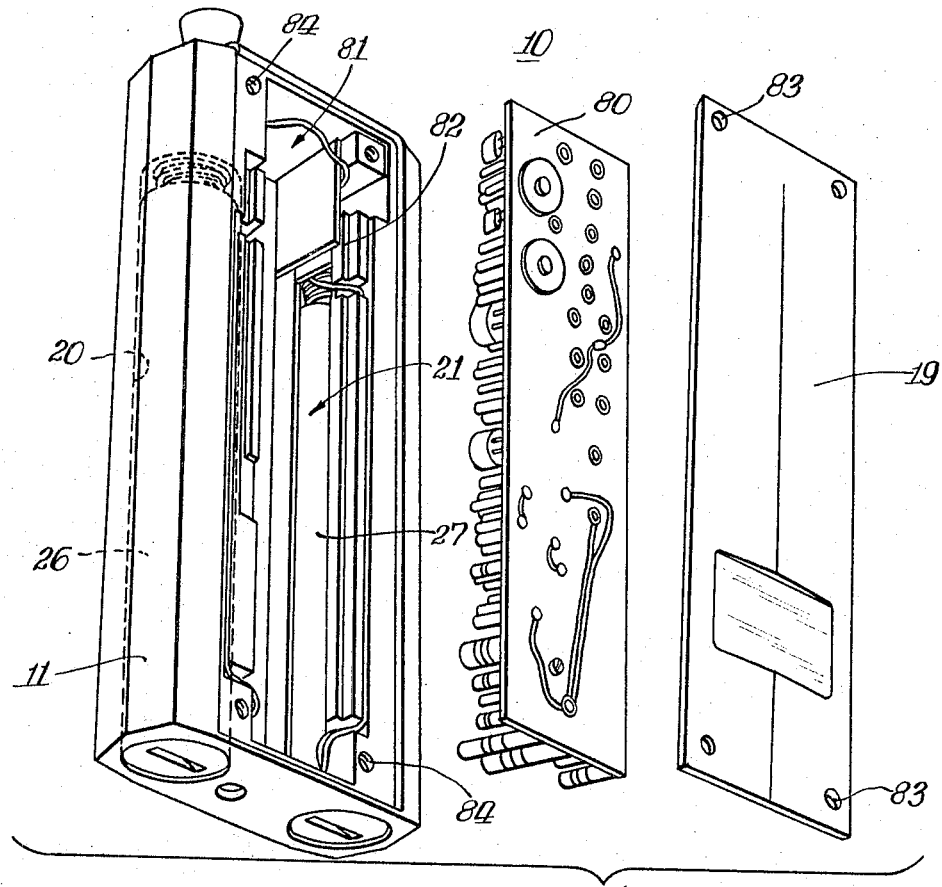
FIG. 3 is a perspective view of the transmitter with the chassis having circuit components mounted thereon removed.

In practicing the invention, a radio transmitter device is provided with a housing which includes a cylindrical battery compartment extending along each side thereof with openings at the bottom for interchangeably receiving both rechargeable and single-use type batteries without modification or substitution of associated component parts. Battery cap covers are rotatably received within the housing openings to secure the batteries therein. Each battery cap cover includes an inner conducting ring insulated from an outer conducting plate with the outer conducting plate further including a recess wherein a resilient contact is retained. The inner conducting ring of the battery cap cover further includes a pair of side flanges which cooperate with a notched conducting ring internally disposed around the housing openings. A contact terminal is provided between the housing openings and electrically connected to the negative pole of one of the series connected batteries. The other pole of each battery is maintained in electrical contact with the conducting rings of each battery cap cover. A projecting tip is included on each of the rechargeable type batteries which makes contact with the resilient springs retained within the recess of the outer conducting plates whereby recharging of the batteries may be effected while within the housing from an external power source electrically connected between the contact terminal and the outer conducting plate of the battery cap cover in electrical contact with the positive pole of the series connected batteries which is at chassis ground potential. The single-use battery does not include such a tip so that the battery contacts only the conducting ring and is effectively insulated from the outer conducting plate of the battery cap cover to prevents inadvertent charging of the same by the external power source.

The radio housing also has an internally threaded ferrule bonded thereto and connected by an electrical lead to the output of the radio transmitter circuitry. An antenna assembly including an externally threaded sleeve, maintained in frictional contact thereon, may be inserted within the ferrule with the threads of the ferrule and sleeve cooperating to secure the antenna assembly therein. Telescopic and loop antennas may be used, and antenna replacement is facilitated as the radio apparatus need not be dismantled and disconnecting leads or solder connections are not required.

Referring to the drawings, FIG. 1 is a perspective view of the pocket radio transmitter 10 as encased in a plastic housing 11 having a push-to-talk switch 12 provided at the side. A talk through grill 13 is integrated in the front panel and the telescopic antenna assembly 14 is extendable from the top to the position shown.

FIG. 2 is a perspective view of the housing with the batteries and associated battery caps 30 and 40 removed. A battery compartment 20 is shown in dotted lines extending along the left side of the housing 11 with a like battery compartment 21 extending along the right side thereof. A rechargeable battery 26 is shown as insertable through the opening 24 in the bottom of the housing 11 within compartment 20 such that the negative pole contacts resilient base spring 22. Likewise, a rechargeable battery 27 may be inserted through opening 25 into compartment 21 with the negative battery pole making contact with resilient base spring 23. Battery cap 30 is rotatably received within opening 24 with the side flanges 31 cooperating with the notched conducting ring 28 to secure the battery within the housing. Likewise, cap 40 is rotatably received within opening 25 with side flanges 41 cooperating with the notch conducting ring 29.

In FIG. 3, a back cover plate 19 is shown detached from the housing 11 to permit the removal of printed circuit chassis 80 containing the circuit components mounted thereon. In the assembled condition, chassis 80 is retained within cavity 81 between battery components 20 and 21. Chassis 80 rests on ledge 82 with the circuit components extending internally within the housing. Cover plate 19 is affixed to housing 11 by machine screws extending through openings 83 and threaded into bushings 84 of housing 11.

In the installation of batteries, as best seen in FIGS. 2, 4 and 5, a battery is inserted in each of compartments 20 and 21 with the negative pole being inserted first to contact base springs 22 and 23 respectively. As shown in FIG. 4, the side flanges 31 of cap cover 30 are first aligned with the opposing slots 50 on the notched lock ring 28. Cap cover 30 is depressed inwardly until side flanges 31 clear the upper edge of the notched ring 28 (best shown in FIG. 5) and then rotated one-half turn until aligned with opposing slots 51 of FIG. 4. Upon release, resilient base spring 22 forces battery 26 and cap cover 30 in an outwardly direction such that flanges 31 then reside in slots 51 to securely lock the battery and battery cap cover within the housing. The positive pole of battery 26 is therefore maintained in electrical contact with conducting ring 32 (FIG. 5) and in turn to the notched lock ring 28 through side flanges 31. An electrical lead 54 (FIG. 4) is connected to notched ring 28, thereby connecting the positive pole of battery 26 to the negative pole of battery 27. In like manner, side flanges 41 of battery cap cover 40 cooperate with slots 52 and 53 of notched lock ring 29 to secure battery 27 and battery cap cover 40 within housing 10. A lead 55 is connected from the radio chassis ground to notched lock ring 29, and thereby to the positive pole of battery 27 through conducting ring 42 of battery cap cover 40.

Figure 9:
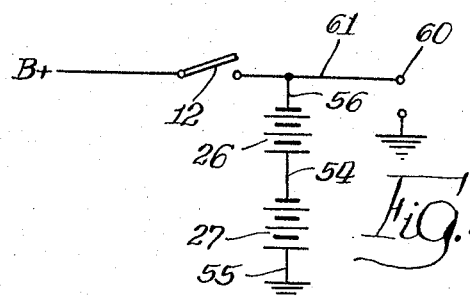
FIG. 9 is a partial schematic showing the manner of connecting the batteries.

FIG. 9 is a schematic representation of batteries 26 and 27 within the radio housing. The batteries are effectively connected in series with lead 54 connecting the negative pole of battery 27 to the positive pole of battery 26. The positive pole of battery 27 is connected to the radio chassis ground with the negative pole of battery 26 being connected to the push-to-talk switch 12 by lead 56.

FIG. 5 shows a cross sectional view of the rechargeable batteries 26 and 27 and associated battery cap covers 30 and 40 in assembled relation. Battery cap cover 30 is constructed with an inner conducting ring 32 insulated from an outer conducting plate 33. A resilient contact spring 34 is retained in recess 35 of plate 33. Contact piston 36 is inserted in the forward end of spring 34. A projecting tip 37 is provided on the positive pole to rechargeable battery 26 which makes contact with piston 37 and to establish electrical continuity with conducting plate 33 through spring 34. Electrical contact is further maintained with conducting ring 32 by the peripheral contact made with the positive end portion of the battery. In like manner, a battery projecting tip 47 maintains electrical continuity with conducting plate 43 of battery cap cover 40 through piston 47 and spring 44.

A recessed contact terminal 60 is disposed between battery compartments 20 and 21 on the bottom side of housing 11. Lead 61 electrically connects terminal 60 to the junction of push-to-talk switch 12 and the negative side of battery 26 (shown schematically in FIG. 9). Rechargeable batteries 26 and 27, connected in series, may therefore by recharged within housing 11 by an external power source having its positive terminal connected to recessed contact terminal 60 and its negative terminal contacting the outer conducting plate 44 of battery cap cover 40 at the radio chassis ground potential. Current will then flow through lead 61 connected to the negative side of battery 26, through batteries 26 and 27 connected in series, and back to the other side of the external power source through conducting plate 44 of battery cap cover 40.

From FIG. 6 it will be readily seen that any attempted recharging of single-use batteries is effectively prevented. Single-use battery 65 is provided without the aforementioned projecting tips, such that electrical continuity is prevented from being established between the battery 65 and conducting plate 33. Only conducting ring 32 is maintained in electrical contact with battery 65.

FIG. 1 shows the telescopic antenna assembly 14 assembled within radio housing 11 and in the fully extended position. FIG. 7 shows antenna assembly 14 removed from the housing and in the retracted position. In this position, the threaded portions of sleeve 18 and the rod portion 19 would extend downward in the assembled condition within cavity 15 shown in dotted lines in FIG. 1.

In assemblying, a threaded ferrule 16 (shown in dotted lines in FIG. 1) is bonded to the housing 11. An electrical lead 17 is soldered to a provided lug on ferrule 16 and connected to the output of the radio transmitter. As shown in FIG. 7, antenna assembly 14 includes a threaded sleeve 18 inserted on rod 19 and maintained in frictional contact by a plurality of tapered finger arms pressing inwardly which are formed by slots 18a around the bottom periphery of sleeve 18. The entire assembly 14 may be inserted through ferrule 16 within cavity 15, with the threaded portion of sleeve 18 cooperating with the internal threads of ferrule 16 to electrically and mechanically connect the antenna assembly to transmitter 10. A knurled portion 18b is included on sleeve 18 to facilitate its rotation within ferrule 16. Convenient antenna insertions and removals are therefore enabled without the necessity of dismantling the radio housing or the disconnection of leads or solder connections.

Figure 8:
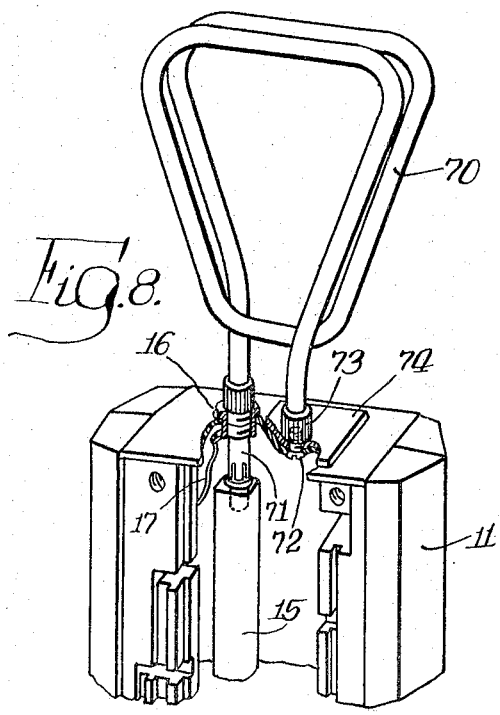
FIG. 8 shows a partial perspective view of the transmitter incorporating a loop-type antenna.

Further, FIG. 8 illustrates the accommodation of a loop type antenna assembly 70 on housing 11. Antenna assembly 70 includes an externally threaded sleeve 71 thereon similar to sleeve 18 on antenna assembly 14. Sleeve 71 cooperates with internally threaded ferrule 16 in the same manner as described in FIG. 1. A formed knockout is included on the underside of the top of housing 11 which is to be drilled completely through to receive a machine screw 72 or the like. A portion of screw 72 is received within the knurled nut 73 on antenna 70 to attach this end to housing 11. A mounting plate 74 is further provided interposed between nut 73 of antenna assembly 70 and the housing 11 to provide added mechanical strength.

It may thus be seen that a pocket-sized radio transmitter is provided having a housing which will accommodate different types of batteries and antennas. Both single-use and rechargeable type batteries may be used without modification or substitution of associated component parts. Provisions are made to recharge the rechargeable battery within the housing from an external power source and to prevent inadvertent charging of single-use, disposable type batteries, when being used. Further, provisions are made on the housing to facilitate convenient antenna replacements without the requirement of soldering or the dismantling of the radio housing.

I claim:

1. A housing for electronic apparatus having power consuming components operable from a self-contained battery, said housing including in combination, an elongated battery compartment extending lengthwise along one side and having an opening at the bottom for receiving a battery, and means for recharging the battery while within said housing from an external power source, said means including a battery cap cover having an inner conducting ring including side flanges, an outer conducting plate and insulating means mechanically connecting said conducting ring and said conducting plate, a notched lock ring secured within said housing and disposed around said compartment opening, and a contact terminal disposed adjacent said compartment opening in the bottom side of said housing, said battery cap cover being rotatably received in said compartment opening with said side flanges cooperating with said notched lock ring to secure said battery within said compartment, said conducting plate of said battery cap cover having a recess therein and resilient contact means retained in said recess and adapted to contact a portion of a rechargeable battery in said compartment whereby an external power source may be connected between said contact terminal and said conducting plate of said battery cap cover to recharge the rechargeable battery, said contact means remaining out of electrical contact with single-use batteries to prevent inadvertent charging of the same.

2. In miniaturized radio apparatus having electrical components and adapted for operation from a self-contained battery power source, an elongated housing for receiving said electrical components and including in combination, an open-end cavity extending along a side thereof for receiving a battery, a battery cap having side flanges adapted to be rotatably received within said cavity opening, a notched lock ring internally secured within said housing and disposed around said cavity opening, an internally threaded ferrule secured to said housing, an antenna assembly having an externally threaded sleeve maintained in frictional contact thereon, said antenna assembly being affixed to said housing by engagement of said threads of said sleeve with said threads of said ferrule, thereby facilitating convenient antenna replacement, said side flanges of said battery cap cooperating with said notched lock ring to secure the battery within said housing, and means for recharging a rechargeable battery while within said housing from an external power source and for preventing inadvertent charging of a single-use battery, said means including resilient contact means retained within a provided recess in said battery cap and adapted to engage a projecting tip included on the positive end of the rechargeable battery to establish electrical continuity to one side of the external power source, and a contact terminal disposed on said housing adjacent said cavity opening and connected to the negative side of the battery for establishing electrical continuity to the other side of the external power source.

3. A housing for miniaturized radio apparatus having power consuming electrical components and adapted for operation from self-contained batteries which may be of the rechargeable type with projecting conducting tips on one end thereof, and of the non-rechargeable type with no projecting tips thereon, said housing including in combination, an open end cavity extending along each side for receiving batteries, first and second battery caps removably secured respectively within said open ends of each cavity to secure the batteries within said cavities, and means for recharging rechargeable batteries while within said housing from an external power source and for preventing inadvertent charging of non-rechargeable batteries, said means including resilient contact means restrained within a provided recess in each of said battery caps and adapted to engage the projecting tip of rechargeable batteries in said cavities to establish electrical continuity to the external power source, and a contact terminal disposed on said housing and connected to the other end of the batteries to complete an electrical circuit to the external power source.

4. A housing and connecting structure for electrical apparatus having power consuming electrical components and adapted for operation from self-contained batteries which may be of the rechargeable type with a projecting conducting tip on one end thereof, and alternatively for operation from batteries of the non-rechargeable type with no projecting tip thereon; said structure including in combination, housing means having a body portion with means extending along each side thereof for receiving an elongated battery, said housing means also having cover means removably secured to said body portion to retain the batteries therein, and connector means for charging rechargeable batteries while within said housing from an external power source and for preventing inadvertent charging of non-rechargeable batteries, said connector means including resilient contact means positioned so as to be engaged by the projecting tip of a rechargeable battery in said housing means, a first contact terminal on said housing means adapted to be connected to a battery therein for connecting the same to the external power source, and a second contact terminal on said housing means connected to said resilient contact means for connection to the external power source, to complete an electrical charging circuit from a rechargeable battery for charging the same while within said housing means, said resilient contact means being out of engagement with a non-rechargeable battery within said housing means to open said electrical charging circuit to prevent inadvertent charging of the non-rechargeable battery.

5. A housing and connecting structure for electrical apparatus having power consuming electrical components and adapted for operation from a self-contained battery which may be of the rechargeable type with terminals for making electrical connections thereto one of which has a projecting conducting tip thereon, alternatively for operation from a battery of the non-rechargeable type having terminals but with no projecting tip on any one thereof, and which structure permits charging of a rechargeable battery when contained therein from an external power supply and prevents inadvertent charging of a non-rechargeable battery; said structure including in combination, housing means having provisions for receiving a battery therein, connector means within said housing means adapted for engaging the terminals of a battery therein to connect the same to the power consuming electrical components, said connector means including one contact having an opening therein adapted for receiving the projecting conducting tip of a rechargeable battery, resilient contact means positioned in said structure so as to be engaged by the projecting tip of a rechargeable battery when it extends through said opening in said one contact, first and second contact terminals on said housing means having portions extending outside said housing means, and means adapted to connect said contact terminals to a rechargeable battery within said housing means including means connecting one of said contact terminals to said resilient contact means to establish an electrical charging circuit connected to a rechargeable battery within said housing means, which circuit when completed extends to said portions of said contact terminals which are outside said housing means to permit charging of the rechargeable battery from an external power supply, said resilient contact means being out of engagement with a non-rechargeable battery to open said electrical charging circuit to prevent inadvertent charging of the non-rechargeable battery.

6. Radio apparatus having power consuming electrical components and adapted for operation from self-contained batteries which may be of the rechargeable type with terminals for making electrical connections thereto one of which has a projecting conducting tip, and alternatively for operation from batteries of the non-rechargeable type having terminals but with no projecting tip thereon, and wherein the rechargeable batteries can be charged while contained in the apparatus and inadvertent charging of non-rechargeable batteries is prevented; said apparatus including in combination, housing means having an elongated body portion with means extending along each side thereof for receiving an elongated battery and cover means removably secured to said body portion to retain the batteries therein, first and second elongated rechargeable batteries having terminals on each end thereof within said battery receiving means, at least one of said batteries having one terminal with a projecting conducting tip thereon, chassis means within said housing means including components extending into the space between said batteries and conductor means connecting said components in a radio circuit, connector means engaging the terminals of said batteries and connecting the same to the radio circuit, said connector means including one contact having an opening therein for receiving said projecting conducting tip of said rechargeable battery, and means for charging said rechargeable batteries while within said housing means from an external power supply including resilient contact means in engagement with said projecting tip of said rechargeable battery which extends through said opening in said one contact, first and second contact terminals on said housing means having portions extending outside said housing means, and means connecting said contact terminals to said rechargeable batteries within said housing means including means connecting one of said contact terminals to said resilient contact means, to thereby establish an electrical charging circuit for said rechargeable batteries within said housing means which extends to said portions of said contact terminals which are outside said housing means for charging said rechargeable batteries from the external power supply, said resilient contact means being unconnected to a non-rechargeable battery when within said housing means to open said electrical charging circuit and prevent charging of the non-rechargeable battery.

7. Radio apparatus having power consuming electrical components and adapted for operation from self-contained batteries which may be of the rechargeable type with terminals one of which has a projecting conducting tip on one end thereof, and alternatively for operation from batteries of the non-rechargeable type with terminals having no projecting tip thereon; said radio apparatus including in combination, housing means having an elongated body portion with means extending along each side thereof for receiving an elongated battery and cover means removably secured to said body portion at one end thereof to retain the batteries therein, chassis means within said housing means including components extending into the space between said battery receiving means and conductor means connecting said components in a radio circuit, telescopic antenna means connected to the radio circuit and supported within said housing means in the space between said battery receiving means and adapted to extend from the end of said housing means opposite said one end, switch means connected to the radio circuit and positioned at said opposite end of said housing means, connector means within said housing means adapted to engage the ends of batteries therein for connecting the same to the radio circuit, said connector means including one contact having an opening therein adapted to receive the conducting tip of a rechargeable battery, resilient contact means positioned to be engaged by the projecting tip of a rechargeable battery when it extends through said opening in said one contact, first and second contact terminals on said housing means having portions extending outside said housing means, and means adapted to connect said contact terminals to a rechargeable battery within said housing means including means connecting one of said contact terminals to said resilient contact means, to thereby establish an electrical charging circuit from rechargeable batteries in said housing means to said portions of said contact terminals which are outside said housing means for charging rechargeable batteries while within said housing means from an external power supply, said resilient contact means being out of engagement with a non-rechargeable battery within said housing means to open said electrical charging circuit to prevent inadvertent charging of the non-rechargeable battery.

References Cited by the Examiner
UNITED STATES PATENTS
3,105,938  10/1963  Onnigian _____ 325—111 X DAVID G. REDINBAUGH, *Primary Examiner.*

B. V. SAFOUREK, *Assistant Examiner.*